United States Patent Office 3,290,146
Patented Dec. 6, 1966

3,290,146
ELECTROPHOTOGRAPHIC MATERIAL AND PROCESS
Martha Tomanek, Wiesbaden-Biebrich, Germany, assignor, by mesne assignments, to Azoplate Corporation, Murray Hill, N.J.
No Drawing. Filed Jan. 10, 1963, Ser. No. 250,494
Claims priority, application Germany, Jan. 13, 1962, K 45,645
21 Claims. (Cl. 96—1)

In electrophotography, an electrostatically charged photoconductive coating on an electrically conducting support is exposed imagewise to light and, as a result, the charge leaks away from the parts of the coating affected by the light. The resultant latent electrostatic image is then rendered visible by development with a toner and is usually afterwards fixed.

Inorganic substances such as selenium, sulfur and zinc oxide have already been used as photoconductors for this purpose. Organic photoconductors such as anthracene, anthraquinone, benzidene, oxadiazoles and triazoles have also been used.

The present invention provides an electrophotographic copying material which consists of an electrically conducting support having thereon an insulating photoconductive coating containing a condensation product of an aromatic orthodicarboxylic anhydride and an aromatic amine.

Such condensation products are excellently suited for the preparation of photoconductive coatings since they yield coatings which are more homogeneous than those hitherto available. The condensation products are mostly colorless and have desirable photoconductive properties. They yield images with sharp lines and contrasts.

These condensation products can be represented by the following formula

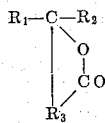

in which $R_1$ and $R_2$ are the same or differing phenyl residues which are substituted in the para position to the central C atom by an amino group or by the residue of a primary or secondary amine and which may contain further substituents, and $R_3$ is a phenyl residue which may be substituted.

The following are examples of substituents: aliphatic radicals such as methyl, ethyl, propyl and butyl; halogen atoms such as chlorine and bromine; amino groups; alkylamino and dialkylamino groups; arylamino; diarylamino; and aralkylamino and alkyl-aralkylamino groups such as the methylamino, propylamino, dimethylamino, diethylamino, dipropylamino, methyl butylamino, phenylamino, naphthylamino, phenyl methylamino, phenylpropylamino, benzylamino, methylbenzylamino and ethyl benzylamino. The aromatic rings of the last mentioned amino compounds may contain halogen atoms and/or short-chain aliphatic hydrocarbon groups as substituents.

The condensation products may be prepared by the condensation of 1 mole of aromatic ortho-dicarboxylic anhydride, e.g. phthalic anhydride, with 2 moles of an aromatic amine, e.g. dimethyl aniline, in the presence of anhydrous zinc chloride. The duration of the reaction is about 1–2 hours at 100° C. and about 3–4 hours at 125° C. The reaction melt is afterwards made alkaline with sodium hydroxide, e.g. to pH 9–10, and the residual unchanged aromatic bases are distilled off with steam. After cooling, the residue is filtered under suction, recrystallized and dried. Reactions of this type are described in "Beilstein," vol. XVIII (1st supplementary vol.) p. 618, and "O. Fischer," Lieb. Ann. d. Chem. 206, p. 93.

The following are examples of the aromatic orthodicarboxylic anhydrides which can be used: phthalic anhydride, and such of its nuclear substitution products containing substituents as previously named as are capable of preparation.

The following are examples of the aromatic amines which have provide suitable for the preparation of the condensation products: aniline, methyl-aniline, dimethyl-aniline, methyl-propyl-aniline, 2-methyl-diethyl-aniline, 2-methyl-aniline, 3-ethyl-dimethyl-aniline, 3-halogen-diethyl-aniline, N-alkoxy-methyl-aniline, N-benzyl-aniline, and N-ethyl-benzyl-aniline.

The following are examples of condensation compounds which may be used for the purposes of the invention:

3,3-bis-(4-dimethylamino-phenyl)-phthalide
3,3-dis-(4-diethylamino-phenyl)-phthalide
3,3-bis-(4-monoethylamino-phenyl)-phthalide
3,3-bis-(4-methylpropylamino-phenyl)-phthalide
3,3-bis-(4-dimethylamino-3-methyl-phenyl)-phthalide
3,3-bis-(4-methylethyl-2,3-dimethyl-phenyl)-phthalide
3,3-bis-(4-dimethylamino-phenyl)-propyl-phthalide
3,3-bis-(4-diethylamino-phenyl)-5-chloro-phthalide
3-(4-ethylmethylamino-phenyl)-3-(4-aminophenyl)-phthalide.

Mixtures of these compounds can also be used in the photoconductive coating.

The coating may also contain inorganic or other organic photoconductors.

The following are examples of materials which may be used as the support: foils of metal, e.g. aluminum, zinc and copper, cellulose products, e.g. paper and regenerated cellulose, cellulose esters such as cellulose acetate and cellulose butyrate and plastics such as polyolefins, e.g. polyethylene and polypropylene, polyvinyl compounds such as polyvinyl chloride, polyvinylidene chloride, polystyrene, polyacrylic compounds such as polyacrylonitrile and polymethacrylate, polyesters such as polyterephthalic acid ester, polyamides, and polyurethanes.

If paper is used as the support, it is advisable to treat it to render it resistant to penetration by coating solutions. Foils to which metal, e.g. aluminum, has been laminated or applied by vacuum deposition are also very suitable as the support.

To prepare the electrophotographic material, the condensation products may be dissolved in organic solvents, such as benzene, acetone, methylene chloride, ethylene glycol monomethyl ether or mixtures of such solvents, and then coated upon the support in the normal manner, e.g. by immersion, spraying, painting or roller application.

It is often advantageous to include resins in the coating. The following are examples of suitable resins: balsam resin, colophony, shellac and synthetic resins such as phenol resins modified with colophony and other resins containing a high proportion of colophony, cumarone resins, indene resins and the substances coming under the collective term "Lack-Kunstharze" (lacquer synthetic resins). As defined, for example, in the Saechtling-Zebrowski plastics handbook, 11th edition (1955), p. 212 et seq., these "Lack-Kunstharze" include modified natural substances such as cellulose ether, polymerides such as vinyl polymers, e.g. polyvinyl chloride, polyvinylidene chloride, polyvinyl acetate, polyvinyl acetals, polyvinylether, interpolymers from vinyl chloride, vinyl acetate and maleic acid, polyacrylic and polymethacrylic esters, and also polystyrene and interpolymers, e.g. from styrene and maleic anhydride, isobutylene, chlorinated rubber, polycondensates, e.g. polyesters such as phthalate resins, alkyd resins, malinate resins, maleic acid/colophony mixed esters of higher alcohols, phenol-formaldehyde resins, particularly colophony-modified phenol/formaldehyde condensates, urea/formaldehyde resins, melamine/formaldehyde condensates, aldehyde resins, ketone resins, xylene/formaldehyde resins, polyamides and polyurethanes. Phthalic acid esters, such as terephthalic acid and isophthalic acid ethylene glycol polyesters, and polyolefins, such as polyethylene and polypropylene of low molecular weight, can be included in the coating.

The relative proportions of resin and condensation products can vary within wide limits. Proportions of two parts by weight of resin and 1 part of condensation product to 2 parts by weight of condensation product and 1 part of resin are to be preferred. Particularly favorable results can be obtained by the use of mixtures of the two substances in 1:1 proportions.

The solution of the condensation product or mixture of condensation products, with or without resins, is applied, as already stated, to the support by painting, roller application or spraying. After drying, an even, homogeneous, transparent photoelectrically conductive coating is formed which is generally colorless. The light-sensitivity of the coating is primarily in the long-wave ultra-violet region. If high-pressure mercury vapor lamps which emit a high proportion of ultra-violet rays are used for exposure, good results can be achieved with very short exposure times.

The spectral sensitivity of the photoconductive coating can be displaced, into the visible region by the addition of suitable sensitizers, so that good results can be obtained with short exposure times even in the visible region. Even very small additions, e.g. less than 0.01% by weight, of sensitizer have a good effect. The amount of sensitizer to be added to the photoconductive coating generally amounts, however, to 0.01–5 percent, preferably 0.1 to 3 percent, by weight. The addition of a larger quantity of sensitizer is possible, but in general no further increase of sensitivity is obtained. Such sensitizers, most of which are dyestuffs, are disclosed in Belgian Patent 558,078.

In use, the coating of the electrophotographic copying material according to the invention is charged, for example, by a corona discharge using a charging device maintained at 6000 to 7000 volts. The copying material is then exposed to light in contact with a master or a master is projected thereon episcopically or diascopically, whereupon an electrostatic image corresponding to the master is formed. This invisible image is developed by being contacted with a developer comprising a carrier and a toner. The developer can also comprise a resin or pigment suspended in a dielectric liquid. The developed image may be fixed, for example by heating with an infra-red radiator to about 100 to 170° C., preferably 120 to 150° C. or by treatment with solvent vapors such as trichlorethylene, carbon tetrachloride, ethyl alcohol or steam. In this way, images are obtained which correspond to the master and are characterized by good contrast effect.

Electrophotographic images so obtained can be converted, after fixing, into printing plates by wiping over the paper or metal support with a solvent for the photoconductive layer, e.g. alcohol, acetic acid or sodium hydroxide solution, and then rinsing it with water and inking it up with greasy ink. The printing plates so obtained can be used in an offset machine. If a transparent support is used, the electrophotographic image can be used as a master for further copying on any desired light-sensitive sheet.

The photoconductive condensation products used as provided by the invention are superior to the substances hitherto used, such as selenium or zinc oxide, because the latter give cloudy photoconductive layers.

When the support is translucent, images can also be produced by the reflex process. The electrophotographic material according to the invention has the advantage that it can be charged either positively or negatively, so that positive images can be obtained both from negative and positive masters with the same photo conductive coating and the same developer by polarity reversal.

If, for example, the coating is negatively charged and exposed under a positive master, a developer which contains a positively charged toner will give positive images. The positively charged toner settles on the negatively charged toner settles on the negatively charged unexposed parts of the coating.

With positive charging, positive copies can be prepared from negative masters under the same conditions. The positive toner is in this case repelled by the positively charged unexposed parts and settles on the discharged exposed parts.

The inevntion will be further illustrated by reference to the following specific examples:

*Example 1*

1 part by weight of 3,3-bis-(4-dimethylamino-phenyl)-phthalide and 1 part by weight of a ketone/formaldehyde resin having a softening temperature of 76–81° C. and an acid number of 0 (Kunstharze AP) are dissolved in 30 parts by volume of ethylene glycol monomethyl ether and the solution is coated upon paper, the surface of which has been pretreated against the penetration of organic solvents and the coating is dried. The coated paper is provided, by a corona discharge, with a negative electric charge and then exposed under a positive master to a high pressure mercury vapor lamp and treated with a developer consisting of a mixture of a carrier and a toner.

The toner consists of a resin/carbon black mixture or of colored resin of particle size between 1 and 100μ. An image of good contrast corresponding to the master is formed and is fixed by slight heating.

If a transparent support is used, e.g. a cellulose acetate foil or transparent paper, the electrophotographically prepared image can be used as a master for further copying.

*Example 2*

4 parts by weight of 3,3-bis-(4-diethylamino-phenyl)-phthalide, 3.5 parts by weight of a styrene interpolymer containing carboxyl groups and having a decomposition temperature of 200–210° C. and a specific gravity of 1.15-1.16 (Lytron 820) and 0.01 part by weight of Rhodamine B extra, dissolved in 100 parts by volume of of ethylene glycol monomethyl ether, are coated upon a mechanically roughened aluminum foil. After evaporation of the solvent, a coating remains which adheres firmly to the surface of the foil. The material so prepared is negatively charged by corona discharge and a diapositive is projected, with an illumination strength of 3 lux, for one minute upon the charged material in a photographic enlarging apparatus. Development is then carried out with a developer consisting of a toner and iron powder, with the aid of a bar magnet, and fixing is effected by heating to 160 to 170° C.

The electrophotographic image so prepared can be converted into a printing plate by wiping the image over with a solution containing 40 percent of methanol, 10 percent of glycerin, 45 percent of glycol and 5 percent of sodium silicate. As a result, the parts of the coating not covered with toner are dissolved away and become hydrophilic, while the remaining parts accept greasy ink so that after the resultant printing plate has been set up in an offset machine, printing can be effected. A long run is obtained.

*Example 3*

80 parts by weight of 3,3-bis-(4-diethylamino-phenyl)-phthalide, 20 parts by weight of 2,5-bis-(4'-diethylamino-phenyl-(1'))-1,3,4-oxadiazole and 0.2 part by weight of Rhodamine B extra are dissolved in 2000 parts by volume of ethylene glycol monomethyl ether. Into this solution, 100 parts by weight of a styrene interpolymer containing carboxyl groups and having a decomposition temperature of 200–210° C. and a specific gravity of 1.15–1.16 are introduced gradually in small portions with stirring. When the resin is dissolved, the solution is filtered. The viscosity of the solution is 9 centipoises. This solution is mechanically coated upon a paper foil laminated to a 10µ thick aluminum foil. After evaporation of the solvent, a coating remains which adheres firmly to the aluminum surface. The material so prepared is cut into sheets and may be perforated for use in an offset printing machine. The foil is negatively charged by a corona discharge and then exposed in the cassette of a process camera containing a reversal prism. A book page with printing on both sides is used as a master. After development and fixing, which is carried out by heating to 160–170° C. for 30 seconds, the foil is set up in an offset machine and converted into a printing plate, for which purpose the surface of the foil is wiped over with a solution containing 45 percent of methanol, 25 percent of ethylene glycol monomethyl ether, 20 percent of glycol, 5 percent of glycerine and 5 percent of 85 percent phosphoric acid, which dissolves away the parts of the coating not covered with toner. After the plate has been wiped over with a sponge moistened with water, it can be used for printing.

*Example 4*

1.5 parts by weight of 3,3-bis-(4-amino-phenyl)-phthalide, 1.5 parts by weight of 3,3-bis-(4-diethylamino-phenyl)-phthalide, and 0.002 part by weight of Astraphloxin are dissolved in 50 parts by weight of methylene chloride. Subsequently, the solution is coated upon transparent paper the surface of which had been pretreated to prevent the penetration of organic solvents. After drying, the coating on the paper is given a positive charge by means of a corona discharge and placed, coated side down, upon a book page with printing on both sides, which had been backed with black paper. This arrangement is then exposed, from the back of the electrophotographic material, for 1 minute to the light of a 100 watt incandescent bulb. After exposure, the reflex image thus produced is developed with a developer consisting of small glass balls covered with resin and a resin powder colored with carbon black. A positive, reversed image is thus obtained. If paper or a plastic foil is placed on the image thus produced and firmly pressed down, the image becomes transferred and a correct-reading image is produced on the paper or foil, respectively. In the production of this correct-reading image, an electrical field may be applied, as is known per se, to the paper or foil which is to accept the image. If the paper or foil is transparent, intermediate originals suitable for the production of further copies on any type of light sensitive paper are obtained.

It will be obvious to those skilled in the art that many modifications may be made within the scope of the present invention without departing from the spirit thereof, and the invention includes all such modifications.

What is claimed is:

1. An electrophotographic material comprising a conductive support layer and a homogeneous photoconductive insulating layer thereon, the latter comprising a condensation product of an aromatic orthodicarboxylic anhydride and an aromatic amine, the condensation product having the formula

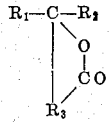

in which $R_1$ and $R_2$ are phenyl groups which are substitute in the para position to the central carbon atom by a member selected from the group consisting of an amino group and the residue of a primary or secondary amine, and $R_3$ is a phenyl group.

2. An electrophotographic material according to claim 1 in which the condensation product is 3,3-bis-(4-dimethylamino-phenyl)-phthalide.

3. An electrophotographic material according to claim 1 in which the condensation product is 3,3-bis-(4-diethylamino-phenyl)-phthalide.

4. An electrophotographic material according to claim 1 in which the condensation product is 3,3-bis-(4-amino-phenyl)-phthalide.

5. An electrophotographic material according to claim 1 in which the insulating layer includes a resin.

6. An electrophotographic material according to claim 1 in which the insulating layer includes a sensitizer.

7. An electrophotographic material according to claim 1 in which the insulating layer includes another photoconductor.

8. A photographic reproduction process which comprises exposing an electrical charged supported photoconductive insulating layer to light under a master and developing the resulting image with an electroscopic material, the photoconductive layer comprising a condensation product of an aromatic orthodicarboxylic anhydride and an aromatic amine, the condensation product having the formula

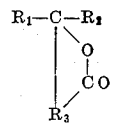

in which $R_1$ and $R_2$ are phenyl groups which as substituted in the apara position to the central carbon atom by a member selected from the group consisting of an amino group and the residue of a primary or secondary amine, and $R_3$ is a phenyl group.

9. A photographic reproduction process according to claim 8 in which the condensation product is 3,3-bis-(4-dimethylamino-phenyl)-phthalide.

10. A photographic reproduction process according to claim 8 in which the condensation product is 3,3-bis-(4-diethylamino-phenyl)-phthalide.

11. A photographic reproduction process according to claim 8 in which the condensation product is 3,3-bis-(4-amino-phenyl)-phthalide.

12. A photographic reproduction process according to claim 8 in which the insulating layer includes a resin.

13. A photographic reproduction process according to claim 8 in which the insulating layer includes a sensitizer.

14. A photographic reproduction process according to claim 8 in which the insulating layer includes another photoconductor.

15. A process for making a printing plate which comprises exposing an electrically charged supported photoconductive insulating layer to light under a master, developing the resulting image with an electroscopic material, fixing the image, and removing the image-free areas of the insulating layer with a solvent, the insulating layer comprising a condensation product of an aromatic orthodicarboxylic anhydride and an aromatic amine, the condensation product having the formula

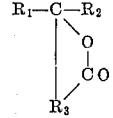

in which $R_1$ and $R_2$ are phenyl groups which are substituted in the para position to the central carbon atom by a member selected from the group consisting of an amino group and the residue of a primary or secondary amine, and $R_3$ is a phenyl group.

16. A process according to claim 15 in which the condensation product is 3,3-bis-(4-dimethylamino-phenyl)-phthalide.

17. A process according to claim 15 in which the condensation product is 3,3-bis-(4-diethylamino-phenyl)-phthalide.

18. A process according to claim 15 in which the condensation product is 3,3-bis-(4-amino-phenyl)-phthalide.

19. A process according to claim 15 in which the insulating layer includes a resin.

20. A process according to claim 15 in which the insulating layer includes a sensitizer.

21. A process according to claim 15 in which the insulating layer includes another photoconductor.

References Cited by the Examiner

UNITED STATES PATENTS

| 2,505,488 | 4/1950 | Green | 117—36.9 |
| 2,548,364 | 4/1951 | Green et al. | 117—36.9 |
| 2,550,473 | 4/1951 | Green et al. | 117—36.9 |
| 3,140,946 | 7/1964 | Cassiers et al. | 96—1 |

NORMAN G. TORCHIN, *Primary Examiner.*

C. E. VAN HORN, *Assistant Examiner.*